3,085,990
HEAT TREATING RUBBERS WITH DINITROSORESORCINOL

Ching C. Tung, Kirkwood, Mo., assignor to Monsanto Chemical Company, St. Louis, Mo., a corporation of Delaware
No Drawing. Filed Jan. 24, 1961, Ser. No. 84,495
12 Claims. (Cl. 260—41.5)

The present invention relates to improved rubber-compositions and to the process of obtaining the same from natural and synthetic elastomers. More particularly the invention relates to heat processing to improve subsequently vulcanized products.

It is an object of the present invention to improve the properties of rubber vulcanizates by a special treating agent. A particular object is to provide by this special treating agent a means to increase the modulus, lower the torsional hysteresis and decrease the internal friction of rubber vulcanizates. A further object is to provide a special treating agent which improves the properties of natural and synthetic rubbers when heated therewith. A specific object is to promote the reaction between natural and synthetic elastomers and carbon black or other reinforcing pigment. A further specific object is to improve dispersion of carbon black and other fillers in rubber.

It has been found in accordance with the present invention that incorporating 2,4-dinitrosoresorcinol into natural and synthetic elastomers and heating with or without the presence of reinforcing pigment markedly improves the properties of vulcanizates prepared from the treated products. Heating is usually within the range of 200–400° F. and preferably within the range of 300–370° F. with heating times ranging from one minute to 16 hours depending upon the conditions. Static conditions require longer times than when the heating is accompanied by mastication. Heating and mastication as for example, in a Banbury mixer permit the reaction to be completed within one to ten minutes. It is desirable to pre-heat the Banbury to at least 300° F. (150° C.) before charging the rubber and catalyst. The heat of mixing even with full cooling raises the temperature 20 to 40 degrees higher depending upon the initial temperature. The process can be completed in a normal mixing cycle after which vulcanizing ingredients are added. For plant scale operation short mixing cycles are desired. Amounts of treating agent of 0.1–5.0% of the rubber hydrocarbon comprise the practical useful range under most conditions. These are not the absolute limits and measurable effects are obtained with even smaller amounts. Similarly, larger amounts can be used but usually without advantage. The preferred range is 0.25–1.0%. Vulcanizing and other ingredients as desired are added, preferably after mixing the rubber, treating agent and reinforcing pigment. If the rubber is treated with the compound in the absence of reinforcing pigment, the pigment is added in the usual manner after treatment. The pigment-modified rubber masterbatch may then be dumped from the Banbury mixer and compounding of vulcanizable mix continued in the usual manner on a rubber mill.

In contrast to nitrosophenol the effect of dinitrosoresorcinol does not depend upon absence of reinforcing pigment during heating with the rubber. On the contrary, the improvements are sometimes greater if reinforcing pigment is present during the heating. In carrying out this embodiment of the invention any of the reinforcing pigments may be used. These include reinforcing silica, furnace black and channel black. Amounts will usually be in the range of 25 to 100% of the rubber and normally 40–50 parts by weight in the case of tread stocks.

The following illustrate specific embodiments of the invention:

A styrene-butadiene rubber latex-carbon black masterbatch was first prepared as follows: 125.0 grams of carbon black (HAF), 1400 ml. of water and 2.5 grams of 2,4-dinitrosoresorcinol were placed in a Waring blender. While stirring at second speed, 62.5 grams of a naphthenic oil was added. Speed was then increased to fourth speed and 1160 grams of styrene-butadiene rubber latex (SBR 1501 latex, 21.6% solids) added as fast as possible. Immediately 300 ml. of 5% sulfuric acid was added as coagulant. After stirring for one minute the coagulated masterbatch was removed by filtration, washed with water, placed on a tray and dried 24 hours at 158–176° F. (70–80° C.). A portion of the masterbatch was heated and milled on a two-roll rubber mill for five minutes at 257° F. (125° C.). Thereafter the mill was cooled to 122° F. (50° C.) and stearic acid, zinc oxide, sulfur and accelerator added over a period of four minutes. The stock was banded on the back roll of the mill, coiled into a cylinder and passed through the mill endwise nine times with the opening set at 0.020". As a control, an identical masterbatch was prepared except that no 2,4-dinitrosoresorcinol was used. The completed formulations were as follows:

| Stock | A | B |
|---|---|---|
|  | Parts by weight | |
| Styrene-butadiene rubber | 100 | 100 |
| Carbon black | 50 | 50 |
| Naphthenic oil | 20 | 20 |
| 2,4-Dinitrosoresorcinol |  | 1 |
| Zinc oxide | 4.8 | 4.8 |
| Stearic acid | 2.4 | 2.4 |
| Sulfur | 2.09 | 2.09 |
| N-Cyclohexyl-2-benzothiazolesulfenamide | 1.44 | 1.44 |

The stocks were cured in the usual manner by heating in a press 60 minutes at 292° F. (144° C.). The modulus of elasticity at 300% elongation at the optimum cure was determined in the usual manner. Torsional hysteresis was determined at room temperature with an apparatus which embodied a torsional pendulum. In this apparatus the sample of rubber tested supplied the force to restore the pendulum when it was deflected. This supplied a measure of the energy not returned on torsional deformation. One-half the logarithmic decrement of the observed amplitude was recorded. Heat rise from the base temperature after flexing in a Goodrich flexometer at 212° F. was also determined. The results are recorded below:

| Stock | 300% Modulus | Torsional Hysteresis | Heat Rise, °F. |
|---|---|---|---|
| A | 1,450 | 0.114 | 73.4 |
| B | 1,650 | 0.079 | 68.0 |

It will be noted that incorporating 2,4-dinitrosoresorcinol in a styrene-butadiene rubber resulted in increased modulus, lower torsional hysteresis and lower heat rise.

As illustrative of the desirable properties imparted to natural rubber, Hevea rubber was charged to a Banbury mixer pre-heated to a temperature of 302° F. and mixed for one minute. Carbon black containing 2,4-dinitrosoresorcinol was then added and mixing continued for three minutes. The Banbury was then swept down and mixing continued for an additional three minutes. The stock was then dumped and passed six times through a rubber mill at 158° F. (70° C.). Vulcanizable stocks were compounded on the mill at 158° F. by adding vulcanizing ingredients and compared to a similarly prepared stock without the 2,4-dinitrosoresorcinol. The completed formulations were as follows:

| Stock | C | D |
|---|---|---|
| | Parts by weight | |
| Smoked sheet rubber | 100 | 100 |
| Carbon black (Philblack I) | 40 | 40 |
| 2,4-Dinitrosoresorcinol | | 0.5 |
| Zinc oxide | 5 | 5 |
| Stearic acid | 3 | 3 |
| Hydrocarbon oil softener | 3 | 3 |
| Antioxidant | 1.5 | 1.5 |
| N-tert.-Butyl-2-benzothiazolesulfenamide | 0.5 | 0.5 |
| Sulfur | 2.5 | 2.5 |

Physical properties obtained by heating the stocks in a press 60 minutes at 292° F. (144° C.) were as follows:

| Stock | 300% Modulus | Torsional Hysteresis |
|---|---|---|
| C | 2,260 | .074 |
| D | 2,310 | .056 |

The process of this invention is not only applicable to natural rubber and butadiene-styrene copolymer rubber but to synthetic rubbery homopolymers of aliphatic conjugated diene hydrocarbons, as for example cis-polybutadiene, cis-polyisoprene and to synthetic rubbery copolymers containing 50% or more of such diolefin hydrocarbons copolymerized with copolymerizable mono-olefinic which includes, besides styrene, acrylonitrile and monovinylpyridine. Mixtures of rubbers are useful, as for example mixtures of natural rubber and butadiene-styrene copolymer rubber. Butyl rubber, a copolymer of at least 85% isobutylene and a small amount, not more than 15%, of diolefin, as for example isoprene, butadiene or piperylene reacts favorably under the conditions described.

The following illustrates use of 2,4-dinitrosoresorcinol in butyl rubber which rubber is normally deficient in resilience. Butyl rubber, 2,4-dinitrosoresorcinol and two-thirds of the carbon black were heated and mixed in a Banbury mixer preheated to a temperature of 284° F. (140° C.). After heating and mixing the composition for five minutes, zinc oxide, stearic acid, hydrocarbon oil softener and the rest of the carbon black were added and mixing continued for another one and one-half minutes. The Banbury was then swept down and mixing continued for another two minutes. The stock was then transferred to a rubber mill at 122° F. (50° C.) and blended with the vulcanizing ingredients. This stock was then compared to a similarly prepared stock without 2,4-dinitrosoresorcinol. The completed formulations were as follows:

| Stock | E | F |
|---|---|---|
| | Parts by weight | |
| Butyl rubber (a copolymer of 97.5% isobutylene and 2.5% isoprene) | 100 | 100 |
| Furnace black (SAF) | 40 | 40 |
| 2,4-Dinitrosoresorcinol | | 0.5 |
| Zinc oxide | 5 | 5 |
| Stearic acid | 1 | 1 |
| Hydrocarbon oil softener | 10 | 10 |
| Tellurium diethyldithiocarbamate | 1 | 1 |
| 2,2'-Dithiobis(benzothiazole) | 1 | 1 |
| Sulfur | 0.75 | 0.75 |

The stocks were cured 45 minutes at 307° F. (153° C.). The physical properties obtained are recorded below:

| Stock | 300% Modulus | Torsional Hysteresis |
|---|---|---|
| E | 610 | 0.145 |
| F | 750 | 0.114 |

The foregoing data demonstrate that 2,4-dinitrosoresorcinol may be used advantageously to improve resilience of butyl rubber stocks. However, replacing 2,4-dinitrosoresorcinol by 4-nitrosoresorcinol in the foregoing formulation resulted in a cured stock with properties no better than the untreated control.

Another test was carried out, similar in procedure to the one just described but in which a mixture of furnace and channel blacks was employed. Masterbatches comprising 100 parts of butyl rubber, 15 parts of furnace black (HAF) and 35 parts of channel black (EPC) were prepared in duplicate, one with 0.5 part of 2,4-dinitrosoresorcinol and one containing no additive. The batches were mixed in the Banbury as described, vulcanizing ingredients added on a mill and vulcanization completed by heating for 45 minutes at 307° F. The completed formulations were as follows:

| Stock | G | H |
|---|---|---|
| | Parts by weight | |
| Butyl rubber (a copolymer of 97.5% isobutylene and 2.5% isoprene) | 100 | 100 |
| Carbon black mixture | 50 | 50 |
| 2,4-Dinitrosoresorcinol | | 0.5 |
| Zinc oxide | 5 | 5 |
| Stearic acid | 1 | 1 |
| Hydrocarbon oil softener | 10 | 10 |
| Tellurium diethyldithiocarbamate | 1 | 1 |
| 2,2'-Dithiobis(benzothiazole) | 1 | 1 |
| Sulfur | 0.75 | 0.75 |

The physical properties obtained are recorded below:

| Stock | 300% Modulus | Torsional Hysteresis | Heat Rise, °F. |
|---|---|---|---|
| G | 850 | 0.169 | 96.8 |
| H | 1,210 | 0.118 | 80.6 |

Heating butyl rubber with reinforcing silica and dinitrosoresorcinol increased the modulus over that obtained in the absence of dinitrosoresorcinol. A masterbatch comprising 100 parts of butyl rubber, 50 parts of reinforcing silica (Hi-Sil X233), 2 parts of stearic acid and 3 parts of glycerol were prepared in duplicate by mixing in a Banbury at 170° F. All parts are by weight. The masterbatches were transferred to a mill and milled at 122° F. To one mixture was added 0.5 part of 2,4-dinitrosoresorcinol. The mixtures were heated on the mill for ten minutes at 300° F., the mill cooled to 122° F. and vulcanizing ingredients added. The completed formulations were as follows:

| Stock | J | K |
|---|---|---|
| | Parts by weight | |
| Butyl rubber | 100 | 100 |
| Reinforcing silica | 50 | 50 |
| Stearic acid | 2 | 2 |
| Glycerol | 3 | 3 |
| 2,4-Dinitrosoresorcinol | | 0.5 |
| Dibutylphthalate | 3 | 3 |
| Zinc oxide | 5 | 5 |
| Mercaptobenzothiazole | 1 | 1 |
| Tellurium diethyldithiocarbamate | 1 | 1 |
| Sulfur | 2 | 2 |

The stocks were vulcanized by heating in a press for 60 minutes at 292° F. Stock J developed a modulus of 930 pounds per square inch as compared to 1200 pounds per square inch developed in Stock K.

Further demonstration of improved properties was shown by mixing the 2,4-dinitrosoresorcinal with butyl rubber in the Banbury for ten minutes at 300° F. before the carbon black was added. A mixture of furnace and carbon blacks was then added to the Banbury and mixing continued for ten minutes. The carbon black-modified butyl rubber masterbatch was then dumped from the Banbury and compounding of the completed mix continued in normal manner on a rubber mill with no further heat treatment. The compositions of the vulcanizable stocks were as follows:

| Stock | L | M |
|---|---|---|
|  | Parts by weight | |
| Butyl rubber | 100 | 100 |
| 2,4-Dinitrosoresorcinol |  | 0.5 |
| Carbon black mixture | 50 | 50 |
| Zinc oxide | 5 | 5 |
| Tetramethylthiuram disulfide | 1 | 1 |
| 2,2'-Dithiobis (benzothiazole) | 1 | 1 |
| Sulfur | 2 | 2 |

Physical properties of the vulcanizates obtained by heating in a press 45 minutes at 292° F. were as follows:

| Stock | 300% Modulus | Torsional Hysteresis |
|---|---|---|
| L | 1,160 | 0.213 |
| M | 1,490 | 0.156 |

These data demonstrate comparable improvement when butyl rubber is heated with 2,4-dinitrosoresorcinol in the absence of carbon black.

It is intended to cover all changes and modifications of the examples of the invention herein chosen for purposes of disclosure which do not constitute departures from the spirit and scope of the invention.

What is claimed is:

1. The process which comprises heating within the range of 250-400° F. for a time within the range of one minute to sixteen hours a vulcanizable elastomer selected from the group consisting of natural rubber, synthetic rubbery homopolymers of aliphatic conjugated diolefin hydrocarbons, synthetic rubbery copolymers containing at least 50% of an aliphatic conjugated diolefin hydrocarbon copolymerized with correspondingly not more than 50% of a copolymerizable monoethylenically unsaturated compound and butyl rubber which is a copolymer of at least 85% isobutylene and a small amount, not more than 15%, of diolefin, said elastomer having incorporated therein 0.1-5.0 parts per 100 parts by weight of elastomer hydrocarbon of 2,4-dinitrosoresorcinol, any vulcanizing agents, if present, being present in amounts insufficient to cause vulcanization.

2. The process of claim 1 in which the vulcanizable elastomer is natural rubber.

3. The process of claim 1 in which the vulcanizable elastomer is butadiene-styrene copolymer rubber.

4. The process which comprises heating and masticating within the range of 300-370° F. for a time within the range of about one minute to ten minutes butyl rubber which is a copolymer of isoprene and at least 85% by weight of isobutylene, said rubber having incorporated therein 0.1-5.0 parts per 100 parts by weight of rubber of 2,4-dinitrosoresorcinol, any vulcanizing agents, if present, being present in amounts insufficient to cause vulcanization whereby the resilience of the subsequently cured product is improved.

5. The process which comprises heating within the range of 250-400° F. for a time within the range of one minute to sixteen hours a vulcanizable elastomer selected from the group consisting of natural rubber, synthetic rubbery homopolymers of aliphatic conjugated diolefin hydrocarbons, synthetic rubbery copolymers containing at least 50% of an aliphatic conjugated diolefin hydrocarbon copolymerized with correspondingly not more than 50% of a copolymerizable monoethylenically unsaturated compound and butyl rubber which is a copolymer of at least 85% isobutylene and a small amount, not more than 15%, of diolefin, said rubber having incorporated therein reinforcing pigment within the range of 25 to 100% of the rubber and 2,4-dinitrosoresorcinol within the range of 0.1-5.0% of the rubber, any vulcanizing ingredients, if present, being present in amounts insufficient to cause vulcanization.

6. The process which comprises heating and masticating within the range of 300-370° F. for a time within the range of one to ten minutes a vulcanizable elastomer selected from the group consisting of natural rubber, synthetic rubbery homopolymers of aliphatic conjugated diolefin hydrocarbons, synthetic rubbery copolymers containing at least 50% of an aliphatic conjugated diolefin hydrocarbon copolymerized with correspondingly not more than 50% of a copolymerizable monoethylenically unsaturated compound and butyl rubber which is a copolymer of at least 85% isobutylene and a small amount, not more than 15%, of diolefin, said rubber having incorporated therein carbon black within the range of 25 to 100% of the rubber and 2,4-dinitrosoresorcinol within the range of 0.1-5.0% of the rubber, any vulcanizing ingredients, if present, being present in amounts insufficient to cause vulcanization.

7. The process of claim 6 in which the vulcanizable elastomer is natural rubber.

8. The process of claim 6 in which the vulcanizable elastomer is butadiene-styrene copolymer rubber.

9. The process of claim 6 in which the vulcanizable elastomer is butyl rubber.

10. A composition comprising unvulcanized natural rubber reacted at a temperature within the range of 300-370° F. for a time within the range of about one minute to sixteen hours, with 0.1-5.0 parts per 100 parts by weight of rubber of 2,4-dinitrosoresorcinol.

11. A composition comprising unvulvanized butadiene-styrene copolymer rubber reacted at a temperature within the range of 300-370° F. for a time within the range of about one minute to sixteen hours, with 0.1-5.0 parts per 100 parts by weight of rubber of 2,4-dinitrosoresorcinol.

12. A composition comprising unvulcanized butyl rubber which is a copolymer of at least 85% isobutylene and a small amount, not more than 15%, of diolefin, reacted at a temperature within the range of 300-370° F. for a time within the range of about one minute to sixteen hours, with 0.1-5.0 parts per 100 parts by weight of rubber of 2,4-dinitrosoresorcinol.

References Cited in the file of this patent

UNITED STATES PATENTS

| 2,315,855 | Howland | Apr. 6, 1943 |
| 2,822,342 | Ford et al. | Feb. 4, 1958 |
| 2,895,937 | Baldwin et al. | July 21, 1959 |